(12) United States Patent
Mike et al.

(10) Patent No.: US 11,198,238 B2
(45) Date of Patent: Dec. 14, 2021

(54) 3D PRINTING OF A STRUCTURE FOR INJECTION MOLDING

(71) Applicant: Stratasys Ltd., Rehovot (IL)

(72) Inventors: Uri Mike, Petach-Tikva (IL); Ore Shtalrid, Yavne (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 16/342,551

(22) PCT Filed: Oct. 18, 2017

(86) PCT No.: PCT/IL2017/051148
§ 371 (c)(1),
(2) Date: Apr. 17, 2019

(87) PCT Pub. No.: WO2018/073822
PCT Pub. Date: Apr. 26, 2018

(65) Prior Publication Data
US 2019/0248054 A1 Aug. 15, 2019

Related U.S. Application Data

(60) Provisional application No. 62/409,508, filed on Oct. 18, 2016.

(51) Int. Cl.
*B33Y 80/00* (2015.01)
*B33Y 10/00* (2015.01)
(Continued)

(52) U.S. Cl.
CPC .......... *B29C 45/2602* (2013.01); *B29C 45/26* (2013.01); *B33Y 10/00* (2014.12); *B33Y 50/00* (2014.12); *B33Y 80/00* (2014.12)

(58) Field of Classification Search
CPC ............ B29C 45/2602; B29C 33/3842; B29C 33/3835; B29C 45/26; B33Y 80/00
See application file for complete search history.

(56) References Cited

U.S. PATENT DOCUMENTS 6,013,714 A  1/2000  Haruta et al.
6,162,849 A  12/2000 Zhuo et al.
(Continued)

FOREIGN PATENT DOCUMENTS

DE  102014104680  5/2020
EP  0431924  6/1991
(Continued)

OTHER PUBLICATIONS

Restriction Official Action dated Feb. 13, 2020 From the US Patent and Trademark Office Re. U.S. Appl. No. 15/756,990. (6 pages).
(Continued)

*Primary Examiner* — Nahida Sultana
*Assistant Examiner* — Debjani Roy

(57) ABSTRACT

A method of additive manufacturing for producing a 2-part mold suitable for use in injection molding, comprises: obtaining a computerized 3D representation of a 2-part mold (3D mold); delimiting one or more regions within the 3D mold; assigning a material or a combination of materials to each delimited region which is different from different from materials used in other delimited regions or outside the delimiting regions; and producing the 2-part mold by additive manufacturing; wherein the delimiting comprises carrying out an offset from a surface of the 3D mold which is intended to be in contact with injected material, and wherein the offset is carried out within the solid part of the 3D mold.

9 Claims, 13 Drawing Sheets

(51) Int. Cl.
*B29C 45/26* (2006.01)
*B33Y 50/00* (2015.01)

(56) References Cited

U.S. PATENT DOCUMENTS

| | | | | |
|---|---|---|---|---|
| 8,050,786 B2* | 11/2011 | Holzwarth | ............. | B33Y 30/00 |
| | | | | 700/98 |
| 9,868,230 B2* | 1/2018 | Dikovsky | ............... | B29C 33/38 |
| 2008/0265459 A1 | 10/2008 | Gasworth et al. | | |
| 2013/0237636 A1 | 9/2013 | Strauss | | |
| 2014/0277664 A1* | 9/2014 | Stump | ..................... | G06F 30/00 |
| | | | | 700/98 |
| 2015/0201500 A1 | 7/2015 | Shinar et al. | | |
| 2016/0039120 A1 | 2/2016 | Dikovsky et al. | | |
| 2018/0243948 A1 | 8/2018 | Matzner et al. | | |

FOREIGN PATENT DOCUMENTS

| | | | |
|---|---|---|---|
| WO | WO 97/16274 | | 5/1997 |
| WO | WO 2011/044903 | | 4/2011 |
| WO | WO 2012/072513 | | 6/2012 |
| WO | WO 2014/141276 | | 9/2014 |
| WO | WO-2014141276 | * | 9/2014 |
| WO | WO 2017/037713 | | 3/2017 |
| WO | WO 2018/073822 | | 4/2018 |

OTHER PUBLICATIONS

Official Action dated Jul. 10, 2020 from the US Patent and Trademark Office Re. U.S. Appl. No. 15/756,990. (17 pages).
Communication Pursuant to Article 94(3) EPC dated Feb. 26, 2019 From the European Patent Office Re. Application No. 16770094.7. (4 Pages).
Communication Relating to the Results of the Partial International Search dated Nov. 30, 2016 From the International Searching Authority Re. Application No. PCT/IL2016/050961. (9 Pages).
International Preliminary Report on Patentability dated May 2, 2019 From the International Bureau of WIPO Re. Application No. PCT/IL2017/051148. (7 Pages).
International Search Report and the Written Opinion dated Jan. 25, 2018 From the International Searching Authority Re. Application No. PCT/IL2017/051148. (10 Pages).
International Search Report and the Written Opinion dated Jan. 30, 2017 From the International Searching Authority Re. Application No. PCT/IL2016/050961. (18 Pages).
Quigley "A Few Ways to Strengthen 3D Printed Parts",3D Printer News & 3D Printing News. 3ders.org, p. 1-17, Oct. 10, 2014.
Supplementary European Search Report and the European Search Opinion dated May 8, 2020 From the European Patent Office Re. Application No. 17861646.2. (8 Pages).
Notification of Office Action and Search Report dated Aug. 31, 2020 From the State Intellectual Property Office of the People's Republic of China Re. Application No. 201780064010.3. (7 Pages).
Translation Dated Sep. 27, 2020 of Notification of Office Action dated Aug. 31, 2020 From the State Intellectual Property Office of the People's Republic of China Re. Application No. 201780064010. 3. (4 Pages).
Official Action dated Jan. 22, 2021 from the US Patent and Trademark Office Re. U.S. Appl. No. 15/756,990. (16 pages).

* cited by examiner

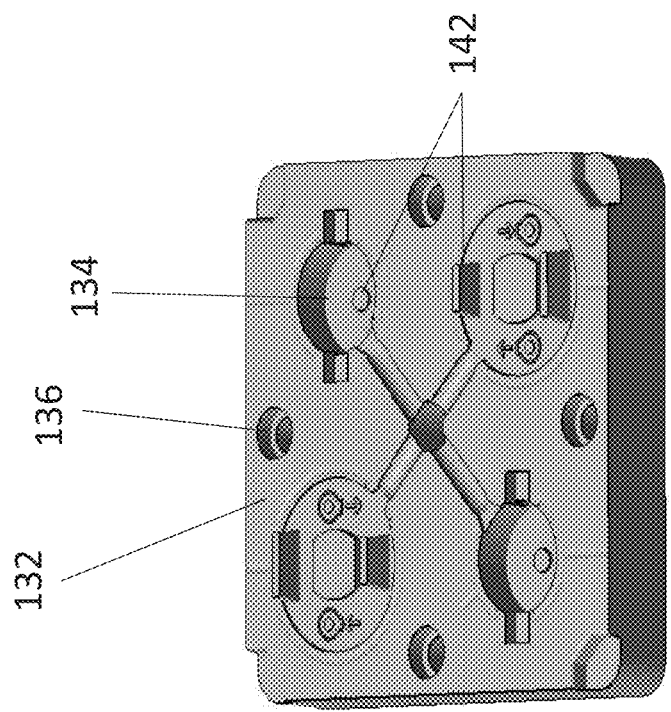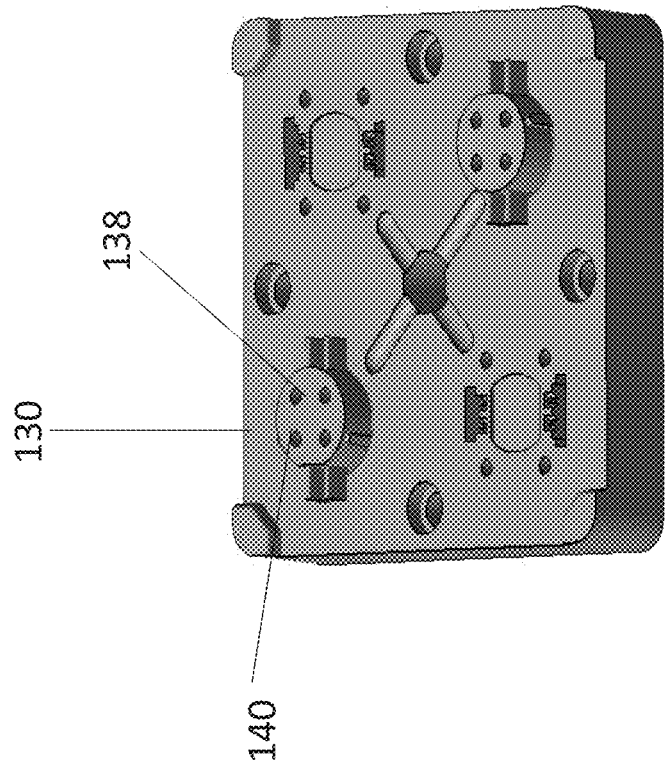
Fig. 5

3D PRINTING OF A STRUCTURE FOR INJECTION MOLDING

RELATED APPLICATIONS

This application is a National Phase of PCT Patent Application No. PCT/IL2017/051148 having International filing date of Oct. 18, 2017, which claims the benefit of priority under 35 USC § 119(e) of U.S. Provisional Patent Application No. 62/409,508 filed on Oct. 18, 2016. The contents of the above applications are all incorporated by reference as if fully set forth herein in their entirety.

FIELD AND BACKGROUND OF THE INVENTION

The present invention, in some embodiments thereof, relates to design of a structure for injection molding, which can be made by additive manufacturing, otherwise known as 3D printing.

The injection molding (IM) process is widely used in industrial manufacturing of parts in all sizes, from small pieces to large components. Injection molded parts are produced by injection of a material, say thermoplastic or thermosetting, into a specifically designed mold, which results in a relatively cheap and fast mass production process. However, production of the mold is an expensive and time consuming one-off effort which is one of the major contributors to the final part production costs. Therefore, the injection molding process tends to be used only for parts for which large volume production is required. Small scale production generally does not make use of injection molding because of the constraints associated with the manufacture of the mold and the cost serves as a barrier to entry for small scale start-ups.

The IM process can be divided into four steps: plastification, injection, holding, and ejection. Polymer pellets are heated to form a melt which is injected into the cavity of a closed mold. The mold generally consists of at least two parts pressed together by a clamping unit. During the injection step, a pressure, which is counteracted by the clamping unit, is built up and maintained until the material in the cavity of the mold has solidified. Then, the mold opens, the molded plastic part is ejected and the mold is closed again for another production cycle. The mold is thus the centerpiece of the IM process. It is generally made of hardened steel, pre-hardened steel, aluminium, and/or beryllium-copper alloy to better sustain the high pressures and temperatures used during the whole process. The mold material is usually selected based on considerations such as long-term durability, cost and its heat dissipation capacity.

On the other hand, 3D printing or additive manufacturing (AM) approaches are gaining more and more attention in the industrial world. AM is a technology which has been developed and improved during the last two decades and enables the production of highly detailed 3D objects with complex shapes in a process wherein the building material is deposited layer-by-layer.

3D printing technologies, especially 3D inkjet printing technologies, could be very attractive in the field of injection molding since single customized molds having complex and detailed configurations could be easily and rapidly produced in this way. The shape of the molds can be easily designed in CAD software and the molds can be produced in several hours and at low cost via additive manufacturing technology, by contrast with standard metal molds which are very expensive and take weeks to be produced.

Furthermore, fast printing of the mold via additive manufacturing would allow "trial-and-error" processes, whereby fine details of the mold can be optimized following testing to achieve improved results. That is to say, an initial mold can be printed and test moldings can be carried out. Thus problems can be identified and adjustments made and then the mold can simply be reprinted with the adjustments in a few hours.

Cheap and fast printing of the mold also enables applying the IM process to low volume production and/or production of prototype molds. However, IM molds are required to sustain high temperatures and high pressures and need to be functional over a life time of at least several thousand injection cycles. In the standard IM process, the materials used for making a mold are metallic, especially stainless steel, which is not suitable for 3D printing. Metals offer several advantages when producing IM molds, especially due to their high heat conductivity (typically above 50 W/mK), excellent mechanical properties, smooth surfaces, and good stability.

In general, such a combination of properties does not characterize polymer materials conventionally employed in 3D printing technologies, especially those used in 3D inkjet technologies, which materials are generally characterized by a low heat resistance, limited toughness, low thermal conductivity, and low abrasion resistance.

International Patent Application No. PCT IL2016/050961 to the present applicants/assignees and unpublished at the date of filing discloses a way of making a mold using 3D printing by using different materials in different parts of the mold to create regions that serve as heat sinks, regions with mechanical strength, regions intended to come into contact with the injected material etc. The disclosure provides a useful and practical mold that can be made by additive manufacturing and which can then be used for injection molding.

Users of injection molding generally want to specify their own mold shapes and yet may not have sufficient knowledge of the thermal and mechanical properties of 3D printing materials and calculation of placement of such materials within a 3D mold in order to design a 3D mold suitable for injection molding.

SUMMARY OF THE INVENTION

The present embodiments address the needs of an end user who wishes to produce customized 3D mold designs but may not have the mechanical or chemical engineering knowledge or know-how regarding the different materials, material strengths and heat conductivity, and relative amounts and arrangement of materials within the mold being fabricated, to enable its use for injection molding.

The present embodiments may thus provide a way of taking the mold shape or geometry specified by the end user and automatically designing the mold with regions having the required material properties for injection molding.

The present embodiments use contour tracking to split the mold into functional and non-functional regions and identifying locations in which the surfaces of the mold may come into contact with the material to be injected. Once the locations in contact with the injection material are identified, the original contour of these locations are offset (within a solid part of the 3D mold) by for instance between 0.5 mm and 5 mm, e.g. by 2 mm, to generate offset layers, i.e. offset regions of heat resistance and mechanical strength. Optionally, a heat removal path or heat sink region that removes heat from the contact regions or surfaces to the outside can be calculated as well. Once the contact and heat sink regions have been identified then the remaining volume of the mold, i.e. non-functional regions may be allocated to be filled with low cost material. Optionally, the outer surfaces of the 3D mold may be offset (within a solid part of the 3D mold) by for instance between 0.5 mm and 5 mm, e.g. by 2 mm, to generate offset regions forming a shell of high toughness/impact resistance.

According to an aspect of some embodiments of the present invention there is provided a method of making a mold for use in injection molding, the method comprising:
  obtaining a mold shape;
  delineating a functional region in the mold by:
    contour tracing at least one contact surface where a wall of the mold is to come into contact with injected material;
    carrying out a first offset from the contact surface into the wall to delineate a first offset region, and designating a first material for the first offset region; and
    carrying out a second offset from the first layer into the wall to delineate a second offset region, and designating a second material for the second offset region; and
  using additive manufacturing to make the mold with the functional region comprising the first offset region made of the first material and the second offset region made of the second material.

The method may comprise carrying out a third offset from the second layer into the wall to delineate a third offset region, designating a third material for the third offset region, and incorporating the third offset region into the mold using the additive manufacturing.

In an embodiment, at least one of the first, second and third offset regions is selected according to a predetermined mechanical property.

In an embodiment, at least one of the first, second and third offset regions is selected according to a predetermined thermal property.

The method may optionally comprise defining a heat removal path starting from the offset regions and incorporating heat conducting material in the heat removal path to form an internal heat-sink within the mold.

The method further comprises generating a convex hull around the mold shape to form a closed mold.

In an embodiment, the closed mold has at least two parts.

The method may comprise subtracting the mold shape from the closed mold; and
  intersecting the subtraction with the closed mold; thereby to delineate the functional region and differentiating it from the remaining non-functional regions.

The method may comprise subtracting the subtraction from the closed mold to obtain the non-functional region.

The method may further comprise designating a filler material for the non-functional regions of the closed mold.

Embodiments may extend to the mold itself, to a molded part made with such a mold and to an object constructed from one or more of the molded parts made with such a mold.

According to a further aspect of the present invention there is provided a computer readable medium comprising instructions to design and print a mold for injection molding, using the method of:
  1) operating a computer to:
    obtain a mold shape;
    delineate a functional region by contour tracing of at least one contact surface where a wall of the mold comes into contact with injected material;
    carry out a first offset from the contact surface into the wall to delineate a first offset region, and designate a first material for the first offset region; and carry out a second offset from the first offset region into the wall to delineate a second offset region, and designate a second material for the second offset region; and
  2) operating a 3D printer to use additive manufacturing to make the mold with the functional region comprising the first offset region made of the first material and the second offset region made of the second material.

The computer readable medium may include magnetic disks, flash memories, including portable disk-on-key flash memories, and memory and disks on servers that download over networks such as the Internet. The term is intended to include the memory both at the serving end and at the downloader's end.

According to a yet further aspect of the present invention there is provided a method of making a mold for use in injection molding the method comprising:
  obtaining a mold shape;
  delineating a functional region by contour tracing of at least one contact surface where a wall of the mold comes into contact with injected material;
  carrying out a first offset from the contact surface into the wall to delineate a first offset region, and designating a first material for the first offset region; and
  using additive manufacturing to make the mold with the functional region comprising the first offset region made of the first material.

According to a yet further aspect of the present invention there is provided a method of additive manufacturing for producing a 2-part mold suitable for use in injection molding, the method comprising:
  (i). obtaining a computerized 3D representation of a 2-part mold (3D mold);
  (ii). delimiting one or more regions within the 3D mold;
  (iii). assigning a material or a combination of materials to each delimited region; and
  (iv). producing the 2-part mold by additive manufacturing; wherein the delimiting comprises carrying out an offset from a surface of the two-part mold which is intended to be in contact with injected material, and wherein the offset is carried out within a solid part of the 3D mold. The mold is thus made of at least two materials or combinations of materials, one for each region and/or one for a non-delineated part of the mold.

In embodiments, obtaining a computerized 3D representation of a 2-part mold comprises providing a solid 2-part mold and digitalizing the mold to generate a 3D representation of the same.

In embodiments, obtaining a computerized 3D representation of a 2-part mold comprises scanning an object and building a computerized 3D representation of a 2-part mold suitable for producing the object by injection molding.

In embodiments, delimiting one or more regions within the 3D mold comprises defining a functional region by:
  a) generating a convex hull of the closed 3D mold;
  b) subtracting the original 3D mold structure from the convex hull to obtain a representation of the internal volumes of the closed 3D mold;
  c) selecting the dominant volume of the internal volumes;
  d) offsetting the dominant volume surfaces within a solid part of the 3D mold;
  e) intersecting the offset region with the original 3D mold; and
  f) defining the resulting region as a functional region.

In embodiments, delimiting one or more regions within the 3D mold comprises defining a non-functional region by:
 a) defining a functional region according to the above;
 b) subtracting the functional region from the original 3D mold; and
 c) defining the resulting region as a non-functional region.

In embodiments, delimiting one or more regions within the 3D mold comprises defining a peripheral region and a core region within the non-functional region by:
 a) defining a non-functional region according to the above;
 b) offsetting the external surfaces of the closed 3D mold within a solid part of the non-functional region of the 3D mold;
 c) defining the offset region as a peripheral region; and
 d) defining the remaining structure of the non-functional region as the core region.

In embodiments, delimiting one or more regions within the 3D mold comprises defining a sub region selected from the list consisting of a heat sink, a conductive sub region, an abrasion-resistant sub region, and a sub region containing cooling tubes.

In embodiments, assigning a material or a combination of materials to each delimited region comprises selecting a material or a combination of materials having:
 a) a heat conductivity of between 0.5 and 10 W/mK;
 b) a toughness/impact resistance of at least 90 J/m$^2$;
 c) a glass transition temperature (Tg) of at least 65° C.;
 d) a heat deflection temperature (HDT) of at least 85° C.; or
 e) any combination thereof.

In embodiments, producing the 2-part mold by additive manufacturing comprises printing the 2-part mold with an 3D inkjet printing system.

According to a further aspect of the present invention there is provided a computer readable medium comprising instructions to design and print a 2-part mold suitable for use in injection molding, using the method of:
 1) operating a computer to:
  (i). delimit one or more regions within a computerized 3D representation of a 2-part mold (3D mold), wherein at least one region is delimited by carrying out an offset from one or more surfaces intended to be in contact with injected material, and wherein the offset is carried out within a solid part of the 3D mold; and
  (ii). assign a material or a combination of materials to each delimited region; and
 2) operating a 3D printer to use additive manufacturing for producing the 2-part mold by depositing the assigned material or combination of materials to each delimited region. The result is a mold having an assigned material or combination within each delineated region which is distinct from materials outside that delineated region.

A further aspect of the present invention is the 2-part mold suitable for use in injection molding produced made according to the above methodology.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is a computer-generated 3D representation showing the upper and lower parts of a 3D mold as may be provided by an end user in an embodiment of the present invention;

DESCRIPTION OF SPECIFIC EMBODIMENTS OF THE INVENTION

Figure 1:
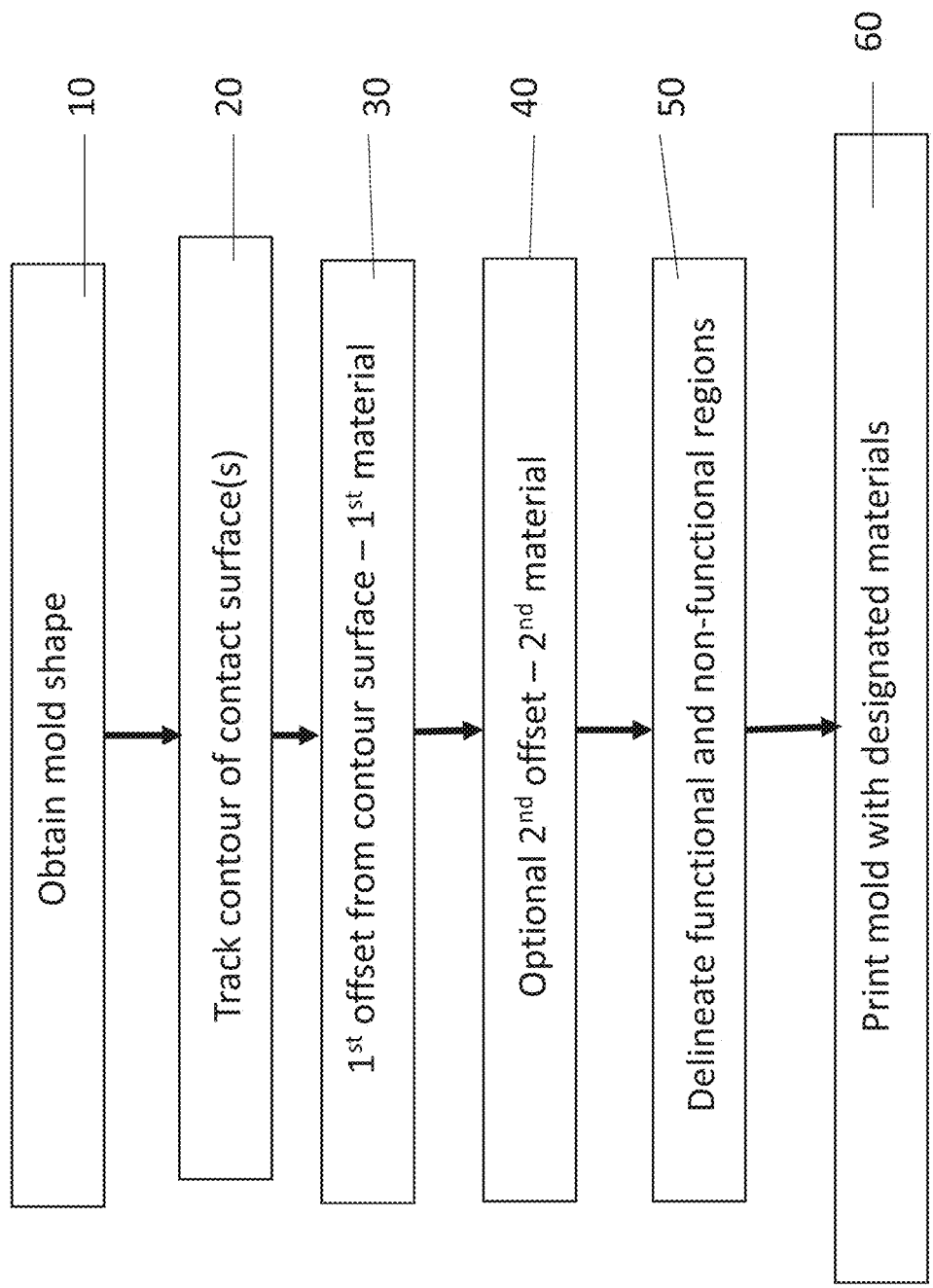
FIG. 1 is a flow chart of an embodiment of the present invention.

The present invention, in some embodiments thereof, relates to design and 3D printing of a structure or mold for injection molding.

As discussed, molding is carried out at high temperature and pressure levels. Materials commonly used in additive manufacturing are plastics. In order for plastics to withstand the aforesaid high temperatures and pressures and provide a reasonable lifetime for the printed mold, the mold may be a composite structure printed from different layers that form regions having different chemical, physical and/or mechanical properties.

The present embodiments may provide end users with the ability to design their own mold shapes, even though they may not have sufficient knowledge about the mechanics and thermal properties of plastic materials nor the know-how to design the layered structure of the 3D mold.

Thus the present embodiments may provide an automated method of generating the layered structure needed to provide the required thermal and mechanical properties. The method may involve identifying and tracking the contours of the contact surface where surfaces of the mold may come into contact with the material being injected, which is where the high temperatures and pressures are experienced. The method then successively offsets from the contact surfaces contours into the mold, to provide offset region(s) with different properties, thus building up, in an algorithmic manner, a functional region of the mold with the necessary combination of materials.

The non-functional regions of the mold may then optionally be assigned a 'filler' material, i.e. a material used to 'fill' or occupy internal spaces, which may have properties different to those of the materials used for the functional regions and/or may be cheaper for use.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a flow chart showing an embodiment of the present invention.

FIG. 1 shows a method of making a mold for use in injection molding. In box 10 a mold shape is obtained from the designer. The mold shape generally comprises two parts, an upper and a lower part. The mold shape may be provided either as a physical object which may be scanned to obtain a computerized 3D representation of the same, or in the form of a computerized 3D representation (e.g. STL file). The computerized 3D representation may be required to be compatible with 3D printing systems. Then in box 20, the contour of the surface(s) expected to be in contact with the injection material is determined. In box 30, an offset of a small distance, for instance between 0.5 mm and 5 mm, e.g. by 2 mm, within a solid part of the 3D mold (i.e. away from the contact surface) is defined. A first material, having particular desired properties such as heat resistance/capacity, may be selected for that offset region. In box 40, an optional second offset within a solid part of the 3D mold may be defined. A second material may be selected for the second offset region, for example a material having particular mechanical properties, e.g. mechanical resilience. In box 50, the offset region(s) are used to determine the functional region(s) wherein a first and optionally a second material are to be deposited. The remainder of the mold is considered as non-functional, so that separate functional and non-functional regions are delineated. The offset may comprise several smaller offsets, each defining a different offset region of material, which, when all assembled together, make a functional mold that has the capacity to cope with molten materials without being melted or mechanically damaged by contact with the molten material. In box 60, additive manufacturing is used to fabricate the mold with layers and regions as designed, including the functional region(s) as described, having the various functional layers or regions, and designated materials.

Figure 2:
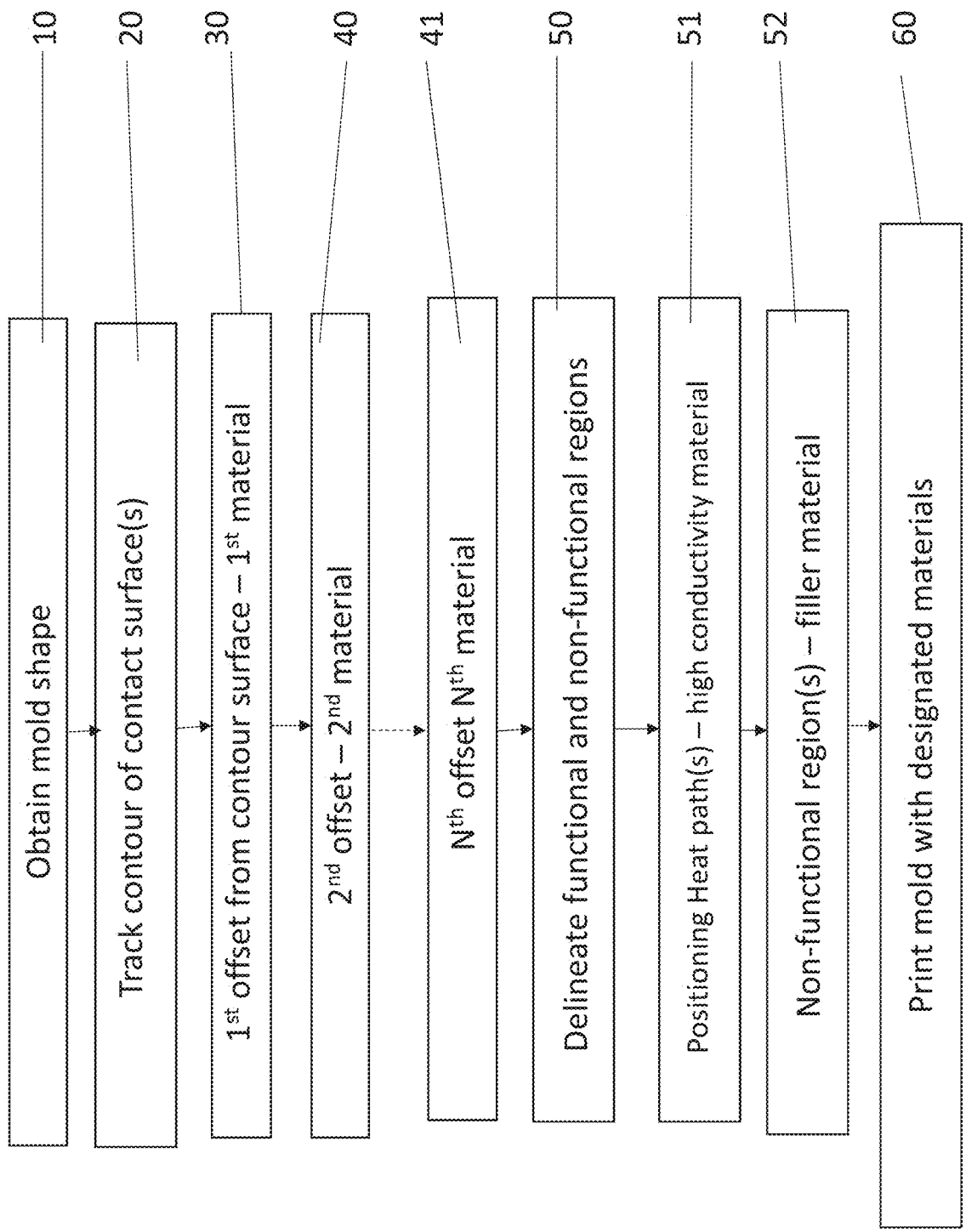
FIG. 2 is a more detailed flow chart of the embodiment of FIG. 1.

Reference is now made to FIG. 2 which is a more detailed flow chart of the embodiment of FIG. 1. Boxes that are the same as in FIG. 1 are given the same reference numerals. As in FIG. 1, in box 10 a mold shape is obtained from the designer. In box 20, the contour of the surface(s) expected to be in contact with the injection material is determined. In box 30, an offset of a small distance, for instance between 0.5 mm and 5 mm, e.g. by 2 mm, within a solid part of the 3D mold (i.e. away from the contact surface) is defined. A first material, having desired properties such as heat resistance/capacity, may be selected for that offset region. In box 40, a second offset within a solid part of the 3D mold is defined. A second material may be selected for the second offset region, for example a material having particular mechanical properties, e.g. mechanical resilience. In box 41, any number of further offsets from the second offset region back into the mold are made to delineate third and subsequent (N) offset regions as needed for the required properties of the mold functional regions, including mechanical toughness, resilience and thermal or heat transfer properties. In box 50, the offset regions are used to determine the functional region(s) wherein a first, a second and optionally (N) further materials are to be deposited. The remainder of the mold is considered as non-functional, so that separate functional and non-functional regions are delineated. Box 51 illustrates the optional definition of a heat removal path from the regions and incorporating heat conducting material in the heat removal path to form an internal heat-sink within the mold. Box 52 indicates the use of filler material(s) for the non-functional regions of the mold. Typically the filler selected would be a material or combination of materials, i.e.

a material having properties different to those of the functional regions of the mold. For example a material used for filling non-functional regions may have heat dissipating properties. A filler material may also be cheaper for use relative to the materials used in other regions of the mold. In box 60, additive manufacturing is used to fabricate the mold with layers and regions as designed, including the functional region(s) as described, having the various functional layers or regions, and designated materials.

Figure 3:
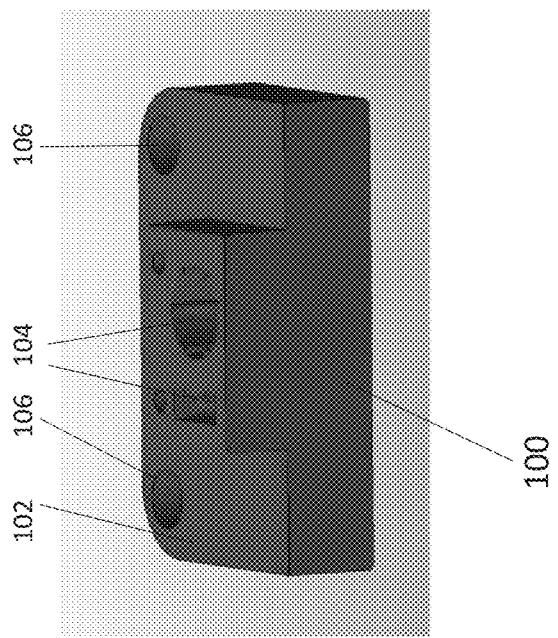
FIG. 3 is a computer-generated 3D cross section of a 3D mold as may be provided by an end user in an embodiment of the present invention.

Reference is now made to FIG. 3, which is a computer-generated 3D cross section of a 3D mold 100 as may be provided by an end user in an embodiment of the present invention. The mold has an outer body 102 and molding cavities 104 which are to contain the injected material and carry out the molding. The inner surfaces of the cavities thus are exposed to the high temperatures and pressures of the molding process. The mold may further have features for helping to handle the mold, such as screw holes 106 to allow the mold to be closed once filled with injected material.

Figure 4:
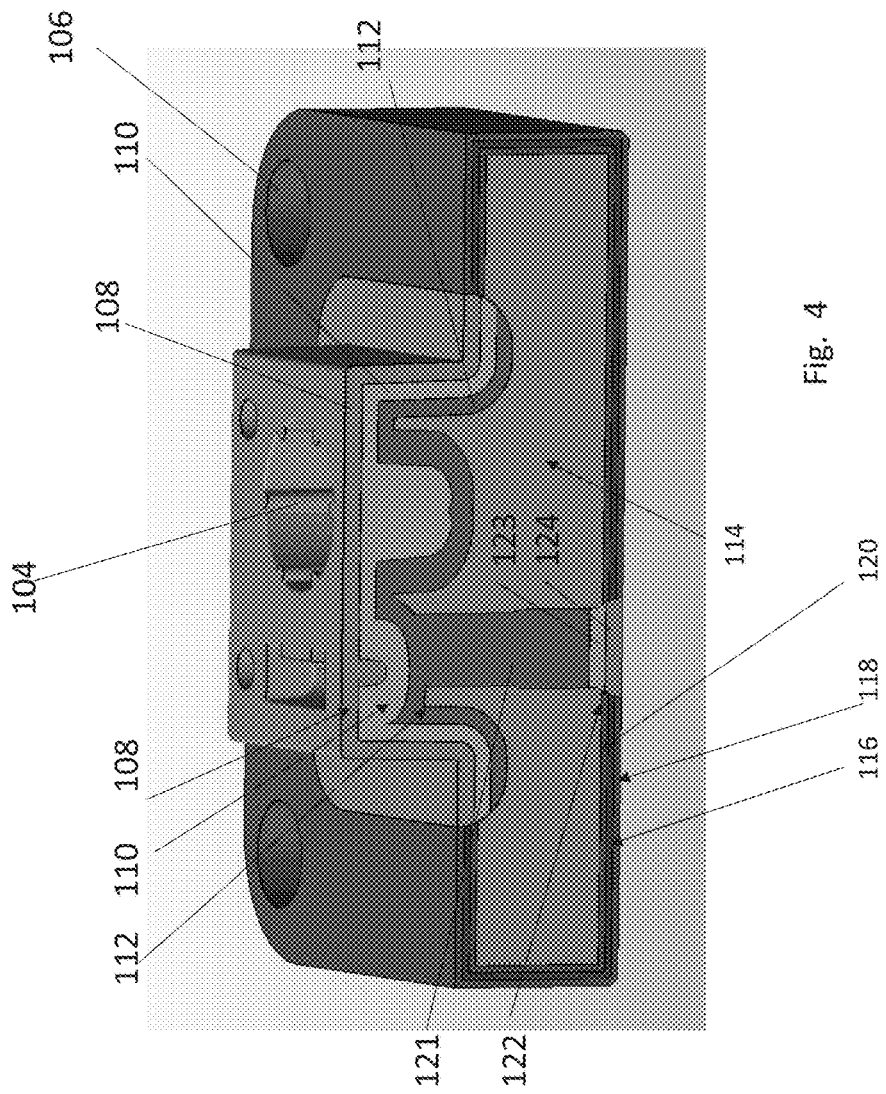
FIG. 4 is a computer-generated 3D cross section showing a layered structure that is applied to the 3D mold of FIG. 3 according to an embodiment of the present invention.

Reference is now made to FIG. 4, which shows a computer-generated 3D cross section having a layered structure that is applied to the 3D mold of FIG. 3 according to an embodiment of the present invention. In FIG. 4, the contours of the cavities 104 are identified and a first region 108 is defined along that contour and offset to extend a short distance into the volume of the mold. A second region 110 then extends deeper into the 3D mold and a third region 112 extends deeper still, although still following the cavity contour. Although not shown, fourth and additional regions may be constructed, as per the requirements of the particular mold.

The non-functional part of the mold forms core 114, which may be made of a filler material, typically a material or combination of materials, wherein a material used for filling non-functional regions may have heat dissipating properties. A filling material may also be cheaper for use. Peripheral regions 116, 118 and 120 may form a shell around the mold. Typically, rigid and/or impact resistant materials are chosen for the shell. The materials for the core and the shell may also be selected algorithmically according to the present embodiments. Leg 121 is an extension of region 112 which may typically be a heat conductive region. The leg provides a thermal path from the contact wall to the outside of the mold at location 122 and thus serves as a built in heat sink for the mold. Additional regions 123 and 124 may be provided at location 122 such as at the contact wall surface to provide required properties.

Reference is now made to FIG. 5, which is a computer-generated 3D representation showing the upper and lower parts 130 and 132 respectively of a 3D mold as may be provided by an end user in an embodiment of the present invention. The parts include cavities 134 for holding molten injection material and features 136 such as screw holes to allow the mold to be operated. Corresponding to the cavities in one part of the mold there may be obtrusions 138 in the other part of the mold, and, as shown there may be smaller cavities 140 in the obtrusions and smaller obtrusions 142 in the cavities, as per the complexity of the parts to be molded.

Figure 6:
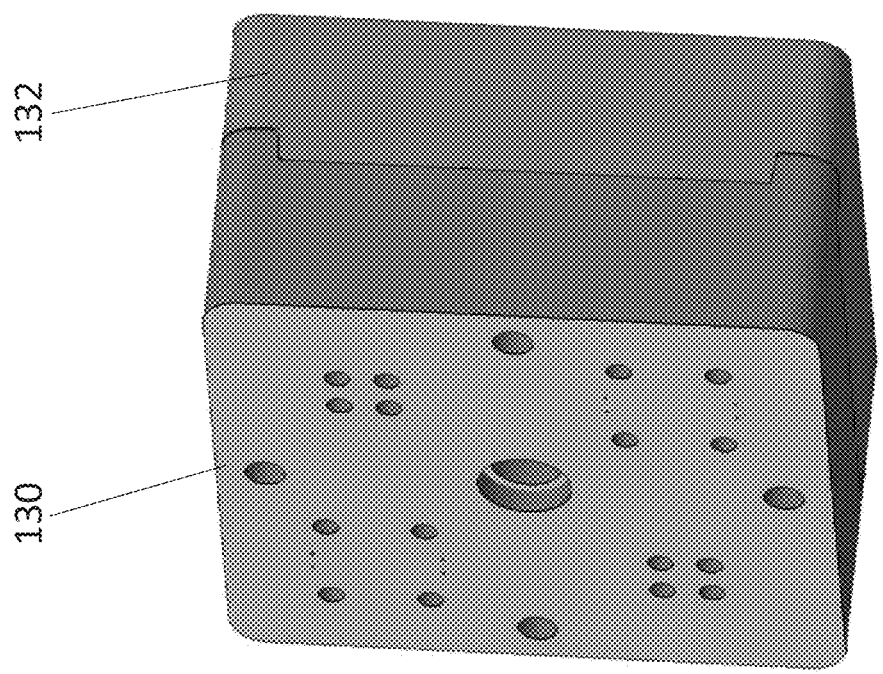
FIG. 6 is a computer-generated 3D representation showing the upper and lower parts of the 3D mold of FIG. 5 placed together and forming a closed mold.

FIG. 6 is a computer-generated 3D representation showing the two halves 130 and 132 of the 3D mold of FIG. 5 fitted together as they would be when carrying out a molding operation.

Figure 7:
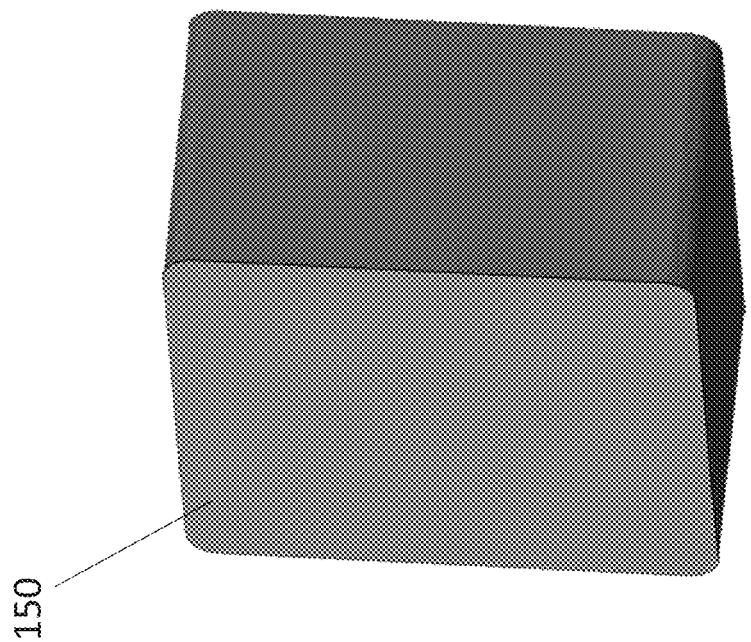
FIG. 7 is a computer-generated 3D representation showing the outer hull of the closed 3D mold of FIG. 6 according to an embodiment of the present invention.

Reference is now made to FIG. 7, which is a computer-generated 3D representation showing the outer hull 150 of the closed 3D mold of FIG. 6 according to an embodiment of the present invention. The hull may typically be a convex, or mostly convex, hull.

Figure 8:
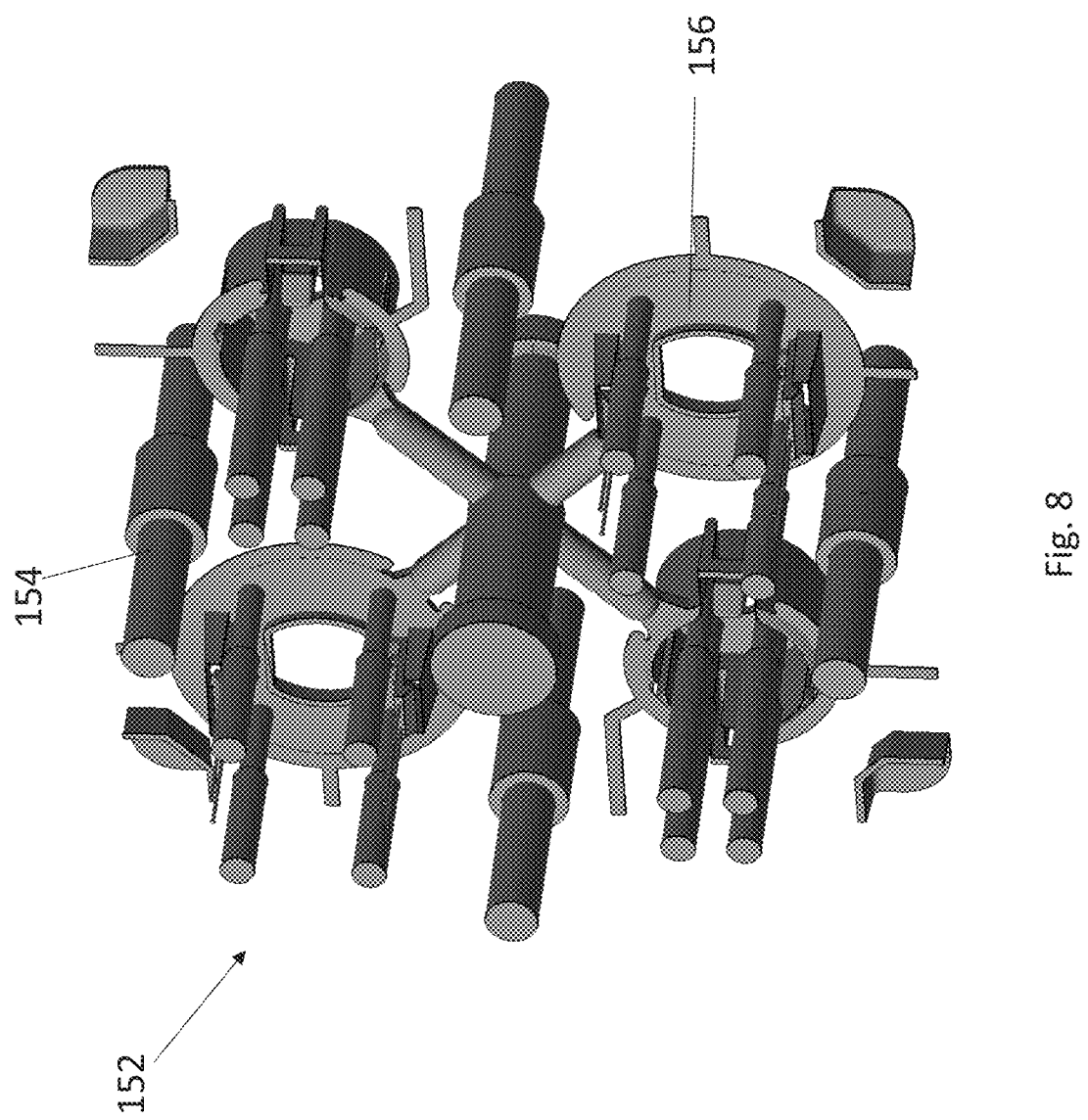
FIG. 8 is a computer-generated 3D representation obtained by subtracting the closed 3D mold of FIG. 6 from the outer hull of FIG. 7 according to an embodiment of the present invention.

FIG. 8 is a computer-generated 3D representation 152 obtained by subtracting the closed 3D mold of FIG. 6 from the outer hull of FIG. 7 according to an embodiment of the present invention. Connecting surfaces and parts are seen 154 as well as the mold region 156 to be filled with the injection material.

Figure 9:
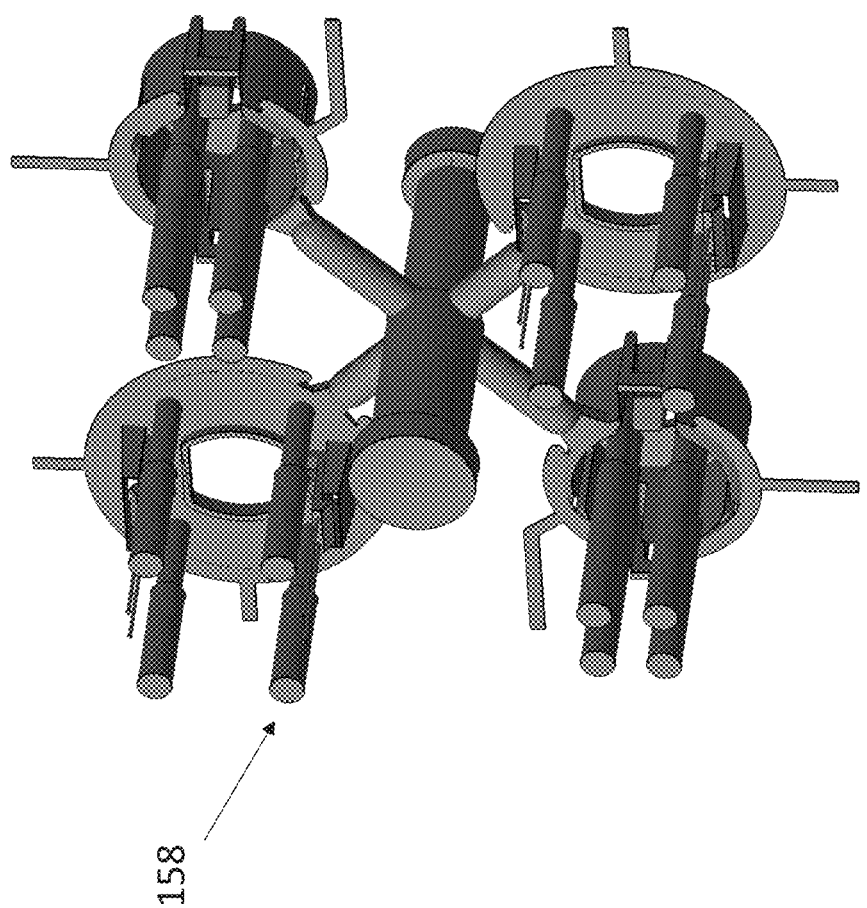
FIG. 9 is a computer-generated 3D representation showing the dominant volume selected according to an embodiment of the present invention.

In FIG. 9, parts such as connecting surfaces are removed and the dominant volume 158 is selected to determine the areas of the mold that are to come into contact with the molten injection material.

Figure 10:
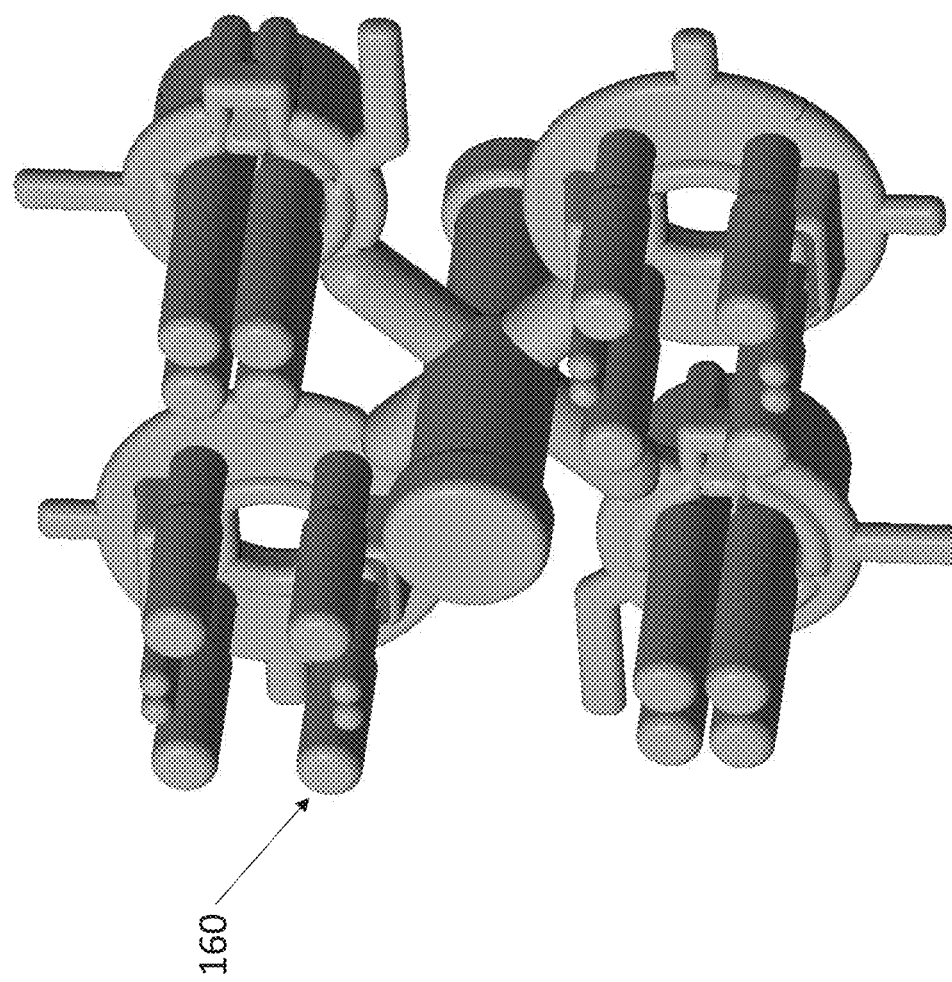
FIG. 10 is a computer-generated 3D representation showing an offset of the dominant volume of FIG. 9 within a solid part of the 3D mold generated according to an embodiment of the present invention.

In FIG. 10 an offset within a solid part of the 3D mold is generated from the surfaces of the dominant volume to provide the first, outermost offset region 160, which may typically be of a high Tg material. Further offset regions may be created to provide additional layers having different mechanical properties.

Figure 11:
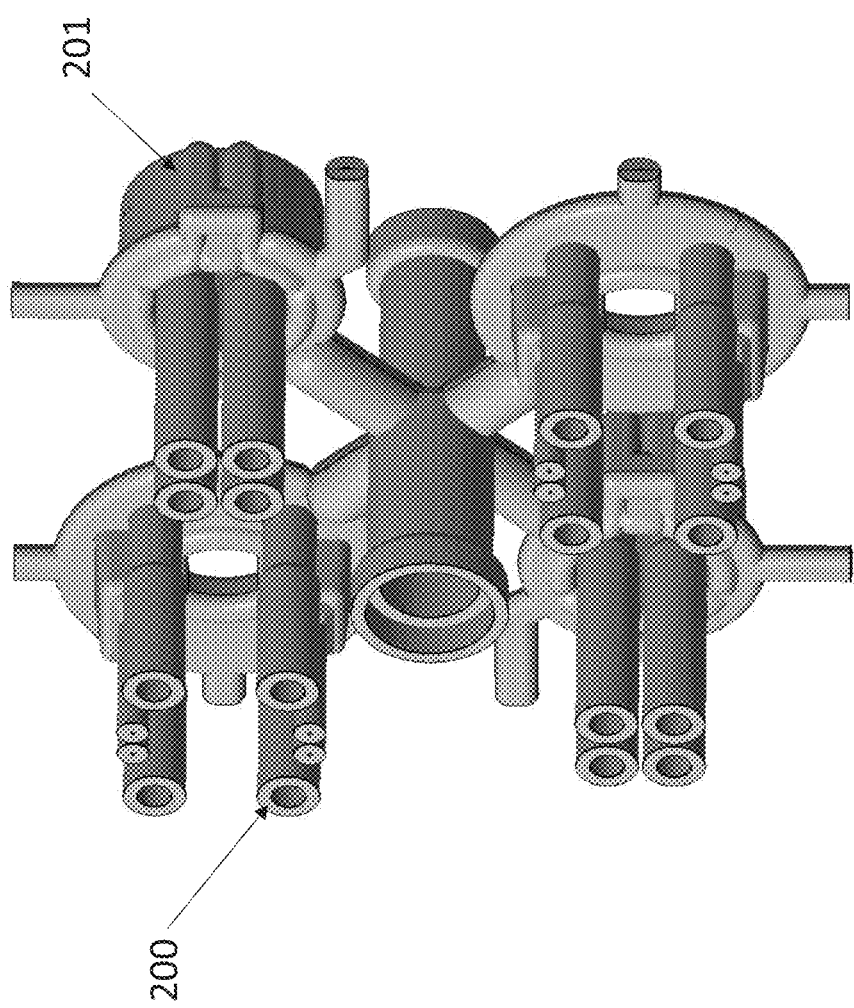
FIG. 11 is a computer-generated 3D representation showing a 3D structure resulting from the intersection of the offset volume shown in FIG. 10 with the closed mold of FIG. 6 according to an embodiment of the present invention.
Figure 12:
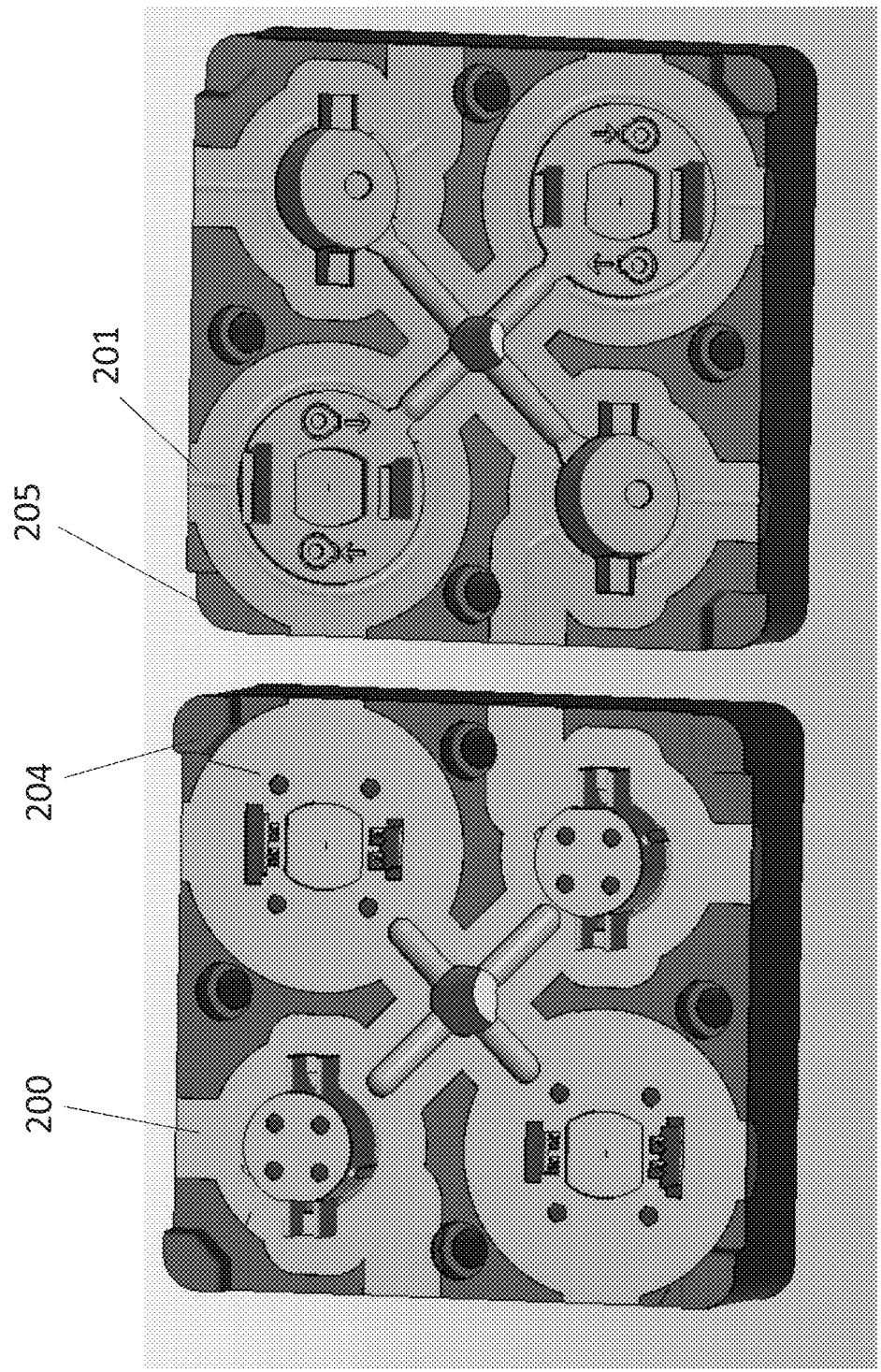
FIG. 12 is a computer-generated 3D representation showing the functional and non-functional regions of the upper and lower parts of the 3D mold of FIG. 5 according to an embodiment of the present invention.

In FIG. 11, the intersection of the offset region(s) of FIG. 10 with the 3D mold of FIG. 6 defines the functional region(s) 200 and 201 from the upper and lower parts respectively. In FIG. 12, the functional region(s) 200 and 201 are subtracted from the original volume of the closed 3D mold appearing in FIG. 6 to give the non-functional regions 204 and 205. Thus the functional and non-functional regions are complementary parts of the closed volume of the 3D mold.

Figure 13:
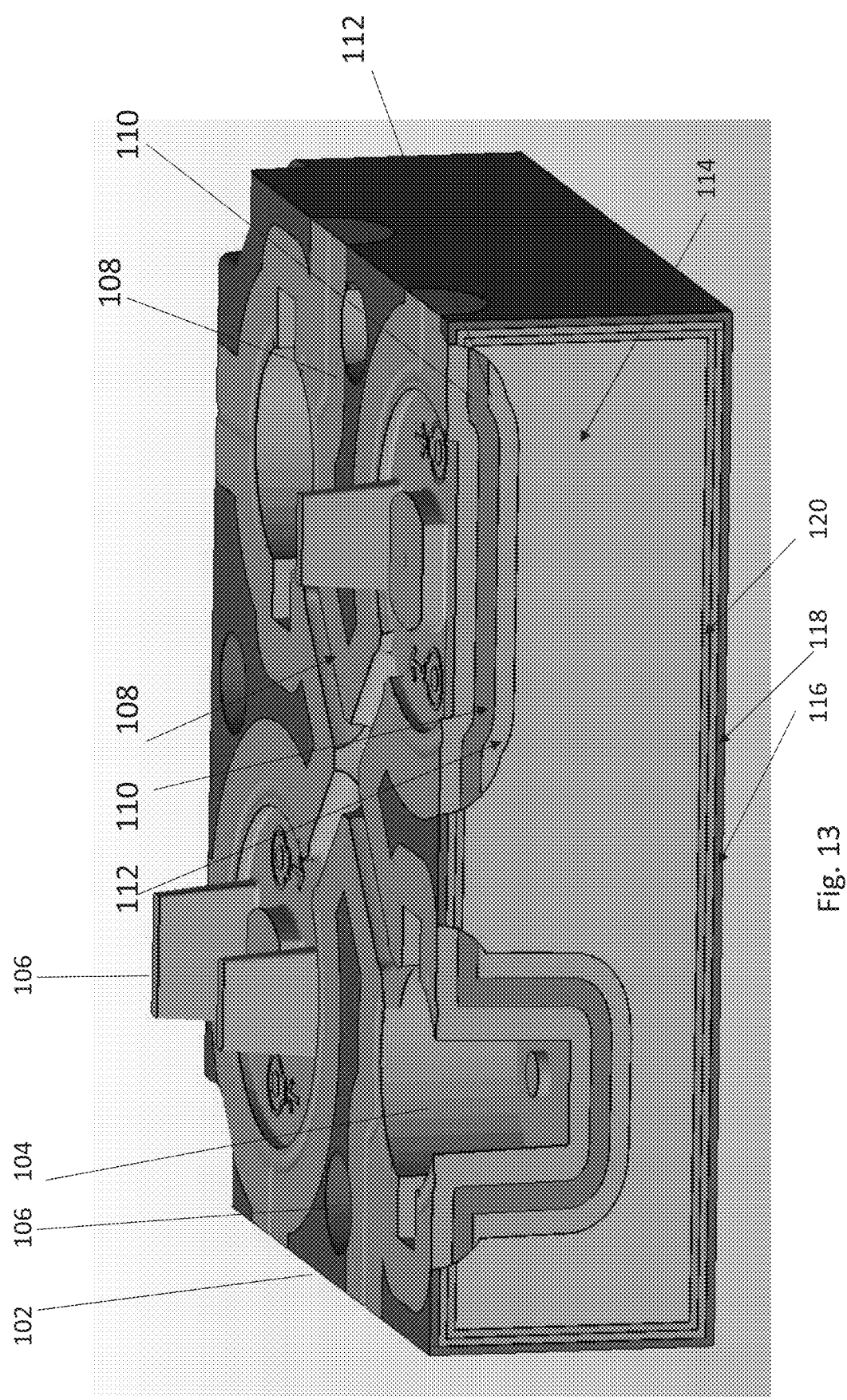
FIG. 13 is a computer-generated 3D cross section of the bottom part of the 3D mold of FIG. 5 showing a layered structure according to an embodiment of the present invention.

FIG. 13 is a computer-generated 3D cross section of the bottom part of the 3D mold of FIG. 5 to be manufactured, showing a layered structure according to an embodiment of the present invention. The mold has an outer body 102 and inner cavities 104 which in use are filled with molten material to form the final product. The mold may further have features for helping to use the mold, such as screw holes or obtrusions 106 to allow the mold to be closed once filled with injection material. The first offset region 108 is provided along the contour that is to be in contact with the hot/molten material at an offset that extends a short distance into the volume of the mold. A second offset region 110 then extends deeper into the mold and a third offset region 112 extends deeper still although still following the cavity contour. Although not shown, fourth and additional offset regions may be constructed, as per the requirements of the particular mold.

The non-functional part of the 3D mold forms for example core 114, which is made of a material or combination of materials, such as a filler material, which may have properties different to those of the materials used for the functional regions, e.g. may be cheaper for use. A material used for filling the core non-functional region may have heat dissipating properties. Peripheral layers 116, 118 and 120 may form a shell around the mold. Typically, rigid and impact resistant materials are chosen for the shell.

Figure 14:
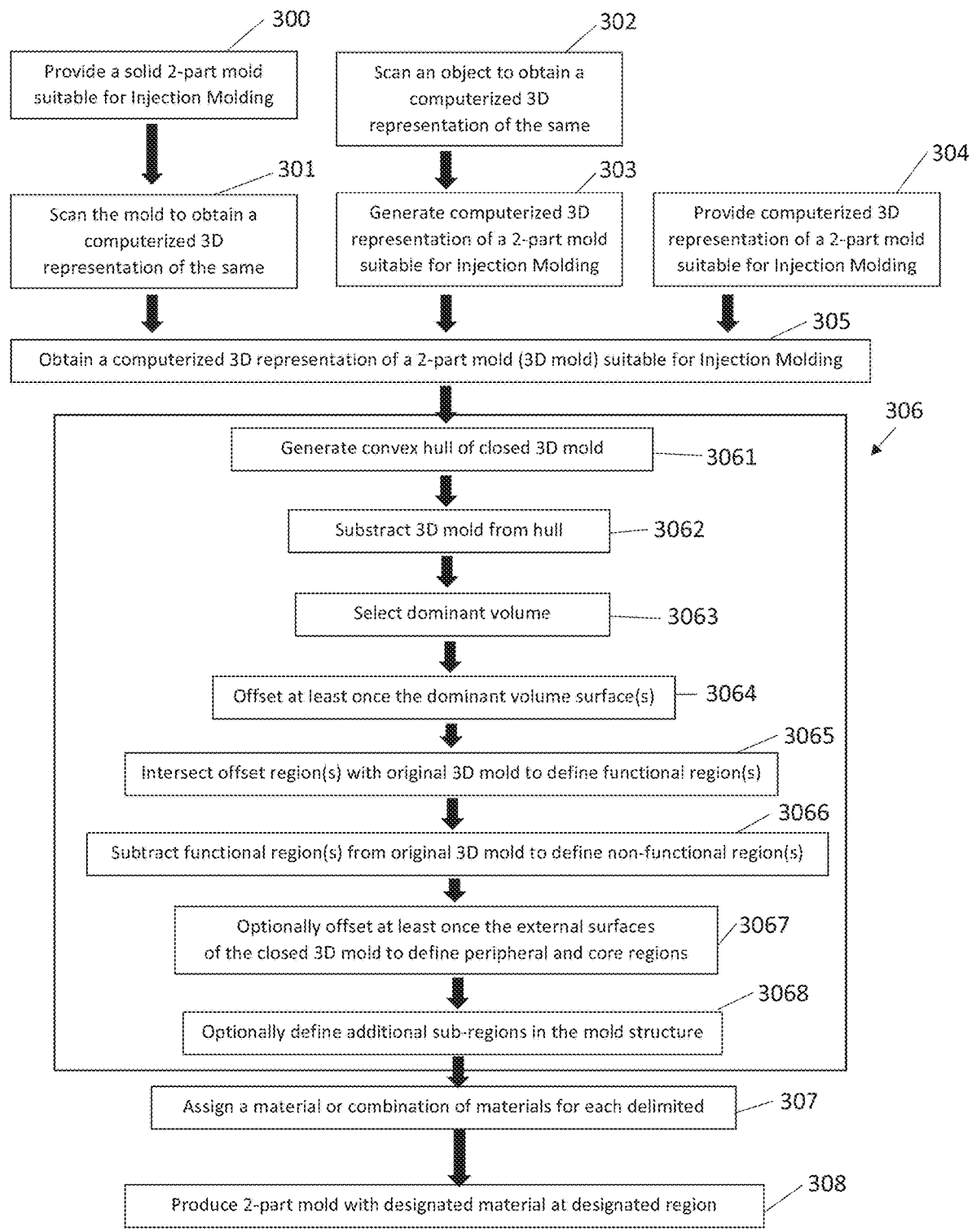
FIG. 14 is a flow chart of a further embodiment of the present invention.

FIG. 14 is a flow chart of a further embodiment of the method for producing a 2-part mold for injection molding according to the present invention. In order to obtain a computerized 3D representation of a 2-part mold (also referred to as "3D mold") suitable for Injection Molding (box 305), one can either provide a solid 2-part mold (box 300) and digitalize it to generate a 3D representation of the same (box 301), or scan an object (box 302) in order to generate a computerized 3D representation of a 2-part mold that would be suitable for producing this object via injection molding (box 303), or be directly provided with a ready-for-use computerized 3D representation of the mold (box 304). Once a computerized 3D representation of a 2-part mold is obtained (box 305), the different regions and/or sub-regions of the 3D mold are delimited in box 306 by (1) generating a convex hull of the closed 3D mold (box 3061);

(2) subtracting the original 3D mold from the convex hull (box 3062) to obtain a computerized 3D representation of the internal volumes of the closed 3D mold; (3) selecting the dominant volume from said internal volumes (box 3063), thereby excluding non-relevant internal volumes (e.g. screw holes); (4) offsetting at least once the dominant volume surfaces within a solid part of the 3D mold (box 3064) to obtain one or more offset regions, each offset region having for instance a thickness comprised between 0.5 mm and 5 mm; (5) intersecting the offset regions with the original 3D mold of box 305 to define one or more functional regions (box 3065); (6) subtracting the functional regions from the original 3D mold of box 305 to define one or more non-functional regions (box 3066); (7) optionally offsetting at least once the external surfaces of the 3D mold within a solid part of the 3D mold non-functional region to define one or more peripheral regions and a core region (box 3067), each peripheral offset region having for instance a thickness comprised between 0.5 mm and 5 mm; (8) optionally determining additional sub-regions in the mold with specific mechanical, chemical or physical properties (e.g. heat sink region, electrically conductive region) (box 3068). Then, a material or a combination of materials (e.g. digital material) is assigned to each delimited region (e.g. functional region, non-functional region, peripheral region, special region, core region) (box 307) and the 2-part mold is eventually produced by additive manufacturing, the different materials being deposited according to the assigned region or sub-region (box 308).

Depending on the needs of the specific mold, different regions may be provided. The regions may vary depending on the materials to be molded and the temperature of the molten materials, as well as the size of the object being molded and the molding pressure.

Different sub-regions may provide parts of the mold with properties in accordance with the following exemplary list:

a) an internal sub-region that allows dissipation of heat accumulating during use of the mold, made of a heat conductive material;

b) an embedded heat sink sub-region for conducting heat away from the internal sub-region allowing dissipation, made of a relatively non-conductive bulk mold material embedded with pipes or like pathways made of relatively heat-conductive material;

c) a sub-region resistant to abrasion, made of an abrasion-resistant polymer;

d) a sub-region resistant to breaking under process conditions, made of a high toughness or high Tg polymer;

e) a sub-region of heat resistant material, resistant to breakage, made of a combination of relatively heat conductive material and polymer material having a high Tg or high HDT;

f) a sub-region for sealing or release, made of a flexible material; and g) a sub-region containing cooling tubes that are hollow and allow flow of a coolant. In addition, sub-regions may be constructed of combinations of the aforementioned materials. That is to say, for dealing with particularly high temperatures, a pipe network can be printed into the mold and coolant liquid can be passed through the pipes for greater efficiency of cooling.

In an embodiment, the materials used may comprise polymers comprising fillers, and each sub-region may comprise a polymer comprising fillers to bestow properties specific to the sub-region, based on a required performance.

In an embodiment, a heat conductivity of the relatively high heat conductive material is between 0.5-10 W/mK.

Herein, the following definitions may apply:
High toughness/impact: at least 90 J/m$^2$
High Tg: at least 65° C.
High HDT: at least 85° C.

In an embodiment, the heat sink sub-region comprises a heat sink printed with conductive polymeric ink, the polymeric ink forming conductive lines and layers designed to dissipate the heat from the internal mold surface.

In an embodiment, the heat conducting material comprises an ink filled with at least one carbon-based material.

In an embodiment, the carbon-based material comprises any of carbon nanotubes, graphene, nano-diamonds and carbon black.

In an embodiment, the heat conducting material comprises micron sized, sub-micron and/or nano particles.

In an embodiment, the micron sized, sub-micron and/or nano particles comprise any of metal nano-particles, ceramic nano particles, nano tubes, nano diamonds, and nano oxides.

In an embodiment, the heat conducting material comprises metal particles the metal particles comprising any of silver, copper, titanium and stainless steel.

In an embodiment, the heat conducting material comprises an ink filled with ceramic particles.

In an embodiment, the ceramic particles comprise any of: ceramic nano-particles, ceramic nano-tubes, and ceramic sub-micron particles.

In an embodiment, the ceramic particles comprise any of boron nitride, silicon nitride and alumina.

In an embodiment, the internal heat sink structure comprises a network of lines of thermally conductive material embedded in surrounding mold material.

An embodiment may comprise providing coolant tubes and pumping coolant through the coolant tubes.

An embodiment may comprise defining at least one sealing zone and printing the sealing zone with a flexible material.

An embodiment may further comprise defining a release zone to provide the mold with flexibility to release a formed product from the mold, and printing the release zone using a flexible material.

In an embodiment, the flexible material comprises any of a rubbery or rubber-like material, a rubbery material with an abrasion resistance filler and a rubbery material with a thermally conductive filler, an elastic, elastomeric or elastomer-like material.

In an embodiment, the abrasion-resistant polymer comprises a polymer containing oxides.

In an embodiment, the oxides comprise at least any of silica, and alumina. In an embodiment, the abrasion resistant polymer comprises a fluorinated material.

The method may comprise determining a part of the mold suffering from most heat accumulation and printing at least one thermally conductive region at such part, the thermally conductive region leading to an array of cooling pathways or even coolant filled cooling tubes within the mold.

The method may comprise printing an inner region with a polymer being both an abrasion resistant and a heat conductive polymer, thereby to allow injection molding using abrasive polymers.

In an embodiment, the polymer being both an abrasion resistant and a heat conductive polymer is a polymer comprising both of a ceramic material filler and a carbon material filler.

The method may comprise printing a rubbery, rubber-like, elastomeric, or flexible layer over a sealing area of the mold to allow for safe extraction of the injection material after molding.

Instructions for carrying out the present method may be held on a computer readable medium such as a magnetic disk, flash memory and the like and applied to a computer and to a 3D printer. In an embodiment the computer readable medium may be located on a networked server and the instructions may be downloaded by the end user.

It is expected that during the life of a patent maturing from this application many relevant forms and methods of additive manufacturing will be developed and the scope of the terms additive manufacturing and 3D printing are intended to include all such new technologies a priori.

The terms "tracing", "tracking", delineating" and "delimiting" are used interchangeably and mean identifying and defining the outline of one or more specific regions in the 3D representation of the 2-part mold.

The term "3D mold" as used herein, means a computerized representation of a solid 2-part mold suitable for injection molding. Typically the 3D mold has cavities (i.e., vacant volume parts), representing the regions in which injection molding material are to be injected and/or features for helping to use the mold, such as screw holes or obtrusions to allow the mold to be closed once filled with injection material. The remaining regions of the 3D mold are defined as solid parts. As used herein, the expression carrying out an offset "within a/the solid part of the 3D mold" means that the offset is carried out in the direction of the solid structure of the 3D mold (and not in the direction of a vacant part).

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of additive manufacturing for producing a 2-part mold suitable for use in injection molding, the method comprising:
   (i) obtaining a computerized 3D representation of a 2-part mold (3D mold);
   (ii) delimiting one or more regions within the 3D mold;
   (iii) assigning a respective material or a respective combination of materials to each delimited region; and
   (iv) producing said 2-part mold by additive manufacturing including providing said respective assigned materials or combinations of materials into said respective delimited regions, which respective assigned materials or combinations of materials are distinct from materials or combinations of materials outside of each respective delimited region;
   wherein said delimiting comprises selecting a dominant volume within said mold, and carrying out an offset from a surface of said 3D mold of said dominant volume, which surface is intended to be in contact with injected material, to form one of said one or more delimited regions between said surface and a further surface formed by said offset, and wherein said offset is carried out within a solid part of said 3D mold.

2. The method of claim 1, wherein obtaining a computerized 3D representation of a 2-part mold comprises providing a solid 2-part mold and digitalizing said mold to generate a 3D representation of the same.

3. The method of claim 1, wherein obtaining a computerized 3D representation of a 2-part mold comprises scanning an object and building a computerized 3D representation of a 2-part mold suitable for producing said object by injection molding.

4. The method of claim 1, wherein delimiting one or more regions within the 3D mold comprises defining a functional region by:
   a) generating a convex hull of the closed 3D mold;
   b) subtracting the original 3D mold structure from the convex hull to obtain a representation of the internal volumes of the closed 3D mold;
   c) selecting the dominant volume of said internal volumes;
   d) offsetting the dominant volume surfaces within a solid part of the 3D mold;
   e) intersecting the offset region with the original 3D mold; and
   f) defining the resulting region as a functional region.

5. The method of claim 1, wherein delimiting one or more regions within the 3D mold comprises defining a non-functional region by:
   a) defining a functional region by:
      generating a convex hull of the closed 3D mold;
      subtracting the original 3D mold structure from the convex hull to obtain a representation of the internal volumes of the closed 3D mold;
      selecting the dominant volume of said internal volumes;
      offsetting the dominant volume surfaces within a solid part of the 3D mold;

intersecting the offset region with the original 3D mold; and defining the resulting region as a functional region;

b) subtracting the functional region from the original 3D mold; and c) defining the resulting region as a non-functional region.

6. The method of claim 5, wherein delimiting one or more regions within the 3D mold comprises defining a peripheral region and a core region within the non-functional region by:

wherein said defining a non-functional region is followed by:

a) offsetting the external surfaces of the closed 3D mold within a solid part of the non-functional region of the 3D mold;

b) defining said offset region as a peripheral region; and c) defining the remaining structure of the non-functional region as the core region.

7. The method of claim 1, wherein delimiting one or more regions within the 3D mold comprises defining a sub region selected from the list consisting of a heat sink, a conductive sub region, an abrasion-resistant sub region, and a sub region containing cooling tubes.

8. The method of claim 1, wherein assigning a material or a combination of materials to each delimited region comprises selecting a material or a combination of materials having:

a) a heat conductivity of between 0.5 and 10 W/mK;

b) a toughness/impact resistance of at least 90 $J/m^2$;

c) a glass transition temperature (Tg) of at least 65° C.;

d) a heat deflection temperature (HDT) of at least 85° C.; or e) any combination thereof.

9. The method of claim 1, wherein producing said 2-part mold by additive manufacturing comprises printing the 2-part mold with an 3D inkjet printing system.

* * * * *